Aug. 1, 1939.  W. O. LYTLE  2,167,764
GLASS BUILDING BLOCK
Filed Sept. 12, 1936

INVENTOR
WILLIAM O. LYTLE
BY Bradley & Bee
ATTORNEYS.

Patented Aug. 1, 1939

2,167,764

UNITED STATES PATENT OFFICE 2,167,764

GLASS BUILDING BLOCK

William O. Lytle, New Kensington, Pa., assignor to Pittsburgh Plate Glass Company, Allegheny County, Pa., a corporation of Pennsylvania Application September 12, 1936, Serial No. 100,481

7 Claims. (Cl. 72—41)

Figure 1:
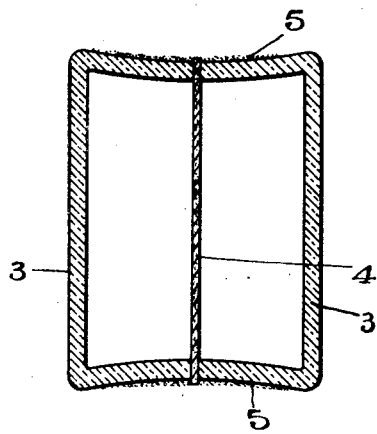
Figure 2:
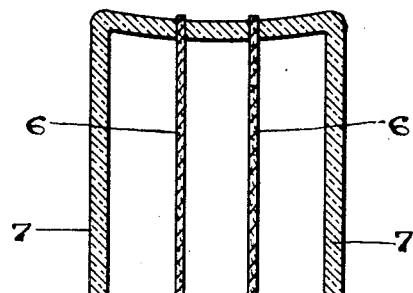
Figure 3:
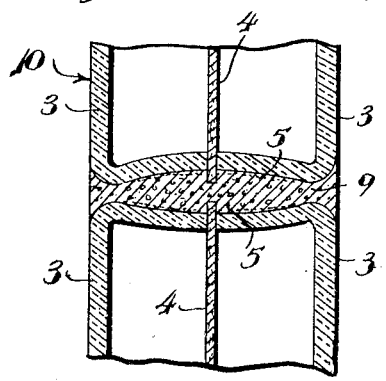

The invention relates to glass building blocks or bricks, and has for its main objects the provision of a block or brick having greater strength and insulating value than bricks heretofore proposed. A further object is the provision of a block of the character specified which presents greater resistance to the passage of radiant heat. Other objects are the provision of a block having improved reinforcing means of a non-shatter character which acts as a seal for the opposing edges of the half sections of the block and serves as a means for securing such edges together and the provision of a block having improved surfaces at its edges for giving better engagement with the cement used to secure the blocks in an assembly. Certain embodiments of the invention are shown in the accompanying drawing, wherein:

Figures 1 and 2 are vertical sections through two forms of the improved block; and Fig. 3 is a fragmentary vertical section of a wall constructed of blocks of the type shown in Fig. 1.

Referring to Fig. 1, the glass sections 3, 3 are the usual rectangular cup shape with their edges in opposition, and between such edges is a sheet 4 of transparent synthetic resin, preferably of a type which becomes strongly adherent to glass under heat and pressure, such as the vinyl acetal resin disclosed in the patent application to E. L. Fix Serial No. 65,599, dated June 23, 1936. This resin has a relatively high capacity for absorbing radiant heat, as compared with glass so that a block employing it is particularly adapted to locations in which the wall made up of the blocks is exposed to sunlight. At the same time the resistance to the passage of visible light rays is not materially reduced.

The block as described, is materially strengthened by the use of the sheet of non-shatter reinforcing, and the insulating capacity is improved incident to the division of the interior into two cells. Further the use of the synthetic resin which is strongly adherent under heat and pressure, provides a convenient means for attaching the half sections of the block together in sealing relation.

Considerable difficulty has been experienced in the use of glass bricks in securing a proper bond between the glass and the cement 9 used when the blocks 3 are assembled in a wall 10, a section of which is shown in Fig. 3. In order to improve the bond, the edge surfaces of the glass sections are preferably provided with a finely divided material 5 which is applied when the sections are first removed from the molds and somewhat soft. The finely divided material may be fibrous glass, metal, or asbestos, or sand or granular metal, or powered or granular glass may be used. The fibers or granules are partially imbedded in the glass surfaces and give a surface which will bond securely with cement. This material may be applied by placing it in the molds in which the bricks are cast.

While vinyl acetal resin is preferably used for the reinforcing sheet, other synthetic resins might be substituted, such as the acrylic and methacrylic acid esters, these resins being adherent under heat and pressure. It is also possible to use resins which are not adherent to glass under heat and pressure, but which would require cements, such as urea formaldehyde, phenol formaldehyde and the glyptal resins, but such resins are less desirable, because the bond is less secure and is made with more difficulty. This also applies to cellulose ester plastics, such as cellulose acetate and nitrate, but it will be understood that in its broader aspect, the invention contemplates the use of such less desirable non-shatter materials.

In the modification of Fig. 2, two reinforcing sheets 6, 6 of resin are employed, between the glass block sections 7, 7, thus dividing the block into three cells, and a spacer 8 of glass or other suitable material is employed between the edges of the sheets 6, 6. The construction in other respects parallels that of Fig. 1. In addition to the reinforcing and heat insulating properties of the resin sheet, it may be colored so as to cut out part of the light or for decorative purposes in which it may be printed with designs. A reflecting coating may be employed to the insulating qualities of the block.

What I claim is:

1. A glass block comprising a pair of opposing similar rectangular cup sections opening toward each other, and a sheet of transparent non-shatter material between the sections engaging the edges thereof dividing the interior of the block into a plurality of cells and constituting a securing and sealing means for the opposing edges of the sections.

2. A glass block comprising a pair of opposing similar rectangular cup sections opening toward each other, and a sheet of synthetic resin permitting the transmission of light therethrough dividing the interior of the block into a plurality of cells and adherent to glass under heat and pressure lying between the sections engaging the edges thereof and constituting a securing and sealing means for such edges.

3. A glass block comprising a pair of opposing similar rectangular cup sections opening toward each other, and a sheet of transparent vinyl acetal resin lying between the sections dividing the interior of the block into a plurality of cells engaging the edges thereof and constituting a securing and sealing means for such edges.

4. A glass block comprising a pair of opposing similar rectangular cup sections opening toward each other, and a sheet of synthetic resin permitting the transmission of light therethrough, but having a high radiant heat absorbing capacity as compared with glass and adherent to glass under heat and pressure, lying between the sections engaging the edges thereof dividing the interior of the block into a plurality of cells and constituting a securing and sealing means for such edges.

5. In a wall of masonry construction, a plurality of glass blocks having edge surfaces arranged in opposed relation, granular material partially embedded in said opposed edge surfaces of the blocks and applied to said blocks without the use of a flux, and a cementing material bonding the blocks and forming with the granular material integral bonded joint construction between adjacent opposed edge surfaces of the blocks.

6. In a wall of masonry construction, a plurality of glass blocks having edge surfaces arranged in opposed relation, granular metal material partially embedded in said opposed edge surfaces of the blocks and applied to said blocks without the use of a flux, and a cementing material bonding the blocks and forming with the granular metal material integral bonded joint construction between adjacent opposed edge surfaces of the blocks.

7. In a wall of masonry construction, a plurality of glass blocks having edge surfaces arranged in opposed relation, a fibrous glass material partially embedded in said opposed edge surfaces of the blocks and applied to said blocks without the use of a flux, and a cementing material bonding the blocks and forming with the fibrous glass material integral bonded joint construction between adjacent opposed edge surfaces of the blocks.

WILLIAM O. LYTLE.